United States Patent
Sauermann et al.

(10) Patent No.: US 12,106,427 B2
(45) Date of Patent: Oct. 1, 2024

(54) RENDERING BACK PLATES

(71) Applicants: Sony Corporation, Tokyo (JP); Sony Pictures Entertainment Inc., Culver City, CA (US)

(72) Inventors: Felix Sauermann, Lawndale, CA (US); Johnny Patterson, Los Angeles, CA (US)

(73) Assignees: Sony Group Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 0 days.

(21) Appl. No.: 16/990,304

(22) Filed: Aug. 11, 2020

(65) Prior Publication Data

US 2021/0183138 A1 Jun. 17, 2021

Related U.S. Application Data

(60) Provisional application No. 62/947,687, filed on Dec. 13, 2019.

(51) Int. Cl.
*G06T 15/20* (2011.01)
*G06T 7/73* (2017.01)

(52) U.S. Cl.
CPC .............. *G06T 15/205* (2013.01); *G06T 7/73* (2017.01); *G06T 2207/10016* (2013.01); *G06T 2207/30244* (2013.01)

(58) Field of Classification Search
None
See application file for complete search history.

(56) References Cited

U.S. PATENT DOCUMENTS

| | | | |
|---|---|---|---|
| 6,084,979 A | 7/2000 | Kanade et al. | |
| 7,050,102 B1 | 5/2006 | Vincent | |
| 9,171,379 B2 | 10/2015 | Mack et al. | |
| 9,519,976 B1* | 12/2016 | Saltzman | H04N 13/246 |
| 9,600,936 B2 | 3/2017 | Boivin et al. | |
| 2004/0233461 A1* | 11/2004 | Armstrong | G01S 5/16 356/620 |

(Continued)

FOREIGN PATENT DOCUMENTS

| | | |
|---|---|---|
| RU | 2606875 C2 | 1/2017 |
| WO | WO-2018089040 A1 | 5/2018 |

OTHER PUBLICATIONS

Chuang et al., "Video matting of complex scenes," Proceedings of the 29th annual conference on Computer graphics and interactive techniques (Year: 2002).*

*Primary Examiner* — Anh-Tuan V Nguyen
(74) *Attorney, Agent, or Firm* — Procopio, Cory, Hargreaves & Savitch LLP

(57) ABSTRACT

Video rendering, including: tracking spatial coordinates of at least one camera during a video sequence forming a shot having multiple frames, wherein each of the at least one camera has a lens; creating a lens profile storing lens data corresponding to the lens of the at least one camera during the shot; encoding the lens data; sending the lens data to a render engine; retracing the movement of the at least one camera during the shot; recreating the lens and one or more (Continued)

characteristics of the lens during the shot; and replicating the shot in a virtual environment using the retraced camera movement and recreated lens characteristics.

16 Claims, 4 Drawing Sheets

(56) References Cited

U.S. PATENT DOCUMENTS

| | | | | |
|---|---|---|---|---|
| 2008/0077963 A1* | 3/2008 | Joseph | ................ | H04N 5/2224 348/584 |
| 2008/0152192 A1* | 6/2008 | Zhu | .................... | G06V 10/147 382/103 |
| 2009/0102841 A1* | 4/2009 | Clavadetscher | ..... | H04N 13/275 345/420 |
| 2010/0245545 A1 | 9/2010 | Ilich-Toay | | |
| 2011/0043627 A1* | 2/2011 | Werling | ................ | G06T 17/05 348/143 |
| 2011/0164030 A1 | 7/2011 | Gay et al. | | |
| 2013/0124159 A1* | 5/2013 | Chen | .................. | H04N 9/04515 703/2 |
| 2014/0139734 A1* | 5/2014 | Chui | ..................... | H04N 23/80 348/441 |
| 2014/0189477 A1* | 7/2014 | Weems, III | .......... | G06T 19/003 715/205 |
| 2014/0254868 A1* | 9/2014 | Sparks | ................. | G01S 3/7864 382/103 |
| 2014/0354690 A1* | 12/2014 | Walters | ................ | G06T 19/003 345/633 |
| 2014/0365980 A1* | 12/2014 | Morrison | ............... | G06T 17/05 715/863 |
| 2016/0037148 A1* | 2/2016 | Jobe | ........................ | H04N 9/74 348/745 |
| 2017/0188013 A1 | 6/2017 | Presler | | |
| 2017/0244956 A1* | 8/2017 | Stiglic | .................... | H04N 7/181 |
| 2018/0308281 A1* | 10/2018 | Okoyama | ............. | G06V 20/64 |
| 2019/0066387 A1 | 2/2019 | Grossmann | | |
| 2019/0333541 A1* | 10/2019 | Mack | ................... | H04N 5/2621 |
| 2019/0358547 A1 | 11/2019 | Mack | | |
| 2020/0035032 A1* | 1/2020 | Klein | ..................... | G06T 19/20 |
| 2020/0364877 A1* | 11/2020 | Bradski | ..................... | G06T 7/11 |
| 2021/0150804 A1* | 5/2021 | Wick | ..................... | G06T 15/503 |

* cited by examiner

RENDERING BACK PLATES

CROSS-REFERENCE TO RELATED APPLICATIONS

This application claims the benefit of priority under 35 U.S.C. § 119(e) of U.S. Provisional Patent Application No. 62/947,687, filed Dec. 13, 2019, entitled "Rendering Back Plates." The disclosure of the above-referenced application is incorporated herein by reference.

BACKGROUND

Field

The present disclosure relates to rendering video, and more specifically, to rendering back plates.

Background

In the conventional system for video production, rendering background "plates" (sometimes referred to as "back plates") includes shooting background scenes without the subject. However, the use of the back plates has disadvantages in that the process involves extensive manual work, and, thus, can be expensive and cumbersome.

SUMMARY

The present disclosure provides for processing and rendering video data.

In one implementation, a method for video rendering is disclosed. The method includes: tracking spatial coordinates of at least one camera during a video sequence forming a shot having multiple frames, wherein each of the at least one camera has a lens; creating a lens profile storing lens data corresponding to the lens of the at least one camera during the shot; encoding the lens data; sending the lens data to a render engine; retracing the movement of the at least one camera during the shot; recreating the lens and one or more characteristics of the lens during the shot; and replicating the shot in a virtual environment using the retraced camera movement and recreated lens characteristics.

In one implementation, the spatial coordinates of each of the at least one camera comprises a position of each camera. In one implementation, the spatial coordinates of each of the at least one camera comprises an orientation of each camera. In one implementation, the orientation of each camera includes pitch, yaw, roll axes used to track local rotation of each camera. In one implementation, the lens profile includes a nodal point which is a point where all light beams intersect and cross within the lens, which is then projected onto the image plane. In one implementation, the lens profile includes at least one of: an image plane distance to the nodal point; a focal length of each camera; a lens distortion profile; an image center shift; a lens aperture; and a focus distance. In one implementation, the method further includes synchronizing the lens data to respective frames of the shot. In one implementation, replicating the shot includes mimicking the lens and the lens characteristics, frame by frame, to replicate the shot virtually.

In another implementation, a system for video rendering is disclosed. The system includes: at least one camera to capture images of a background scene, the at least one camera to output the captured images as camera data, wherein each of the at least one camera has a lens; at least one sensor to track spatial coordinates of the at least one camera during a video sequence forming a shot having multiple frames, the at least one tracker to output the tracked spatial coordinates as sensor data; and a processor coupled to the at least one camera and the at least one sensor, the processor to generate a lens profile storing lens data corresponding to the lens of the at least one camera during the shot, wherein the processor processes the camera data, the sensor data, and the lens data to replicate the shot.

In one implementation, the lens data is synchronized to respective frames of the shot. In one implementation, the lens data is synchronized to a time code. In one implementation, the system further includes a renderer to render the replicated shot. In one implementation, the processor encodes the lens data, retraces movement of the at least one camera during the shot, recreates lens and one or more characteristics of the lens, and replicates the shot in a virtual environment. In one implementation, the system further includes a render engine to retrace movements of the at least one camera and mimic the lens and its characteristics, frame by frame, to replicate the shot virtually.

In another implementation, a non-transitory computer-readable storage medium storing a computer program to render video is disclosed. The computer program includes executable instructions that cause a computer to: track spatial coordinates of at least one camera during a video sequence forming a shot having multiple frames, wherein each of the at least one camera has a lens; generate a lens profile storing lens data corresponding to the lens of the at least one camera during the shot; encode the lens data; send the lens data to a render engine; retrace the movement of the at least one camera during the shot; recreate the lens and one or more characteristics of the lens during the shot; and replicate the shot in a virtual environment using the retraced camera movement and recreated lens characteristics.

In one implementation, the spatial coordinates of each of the at least one camera comprises a position of each camera. In one implementation, the lens profile includes a nodal point (which is located on the optical axis) which is a point where all light beams intersect and cross within the lens, which is then projected onto the image plane. In one implementation, the lens profile includes at least one of: an image plane distance to the nodal point; a focal length of each camera; a lens distortion profile; an image center shift; a lens aperture; and a focus distance. In one implementation, the computer program further includes executable instructions that cause the computer to synchronize the lens data to respective frames of the shot. In one implementation, the executable instructions that cause the computer to replicate the shot includes executable instructions that cause the computer to mimic the lens and the lens characteristics, frame by frame, to replicate the shot virtually.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, the use of the back plates in rendering the background in video productions has disadvantages in that the process involves extensive manual work. Therefore, the process can be expensive and cumbersome.

Certain implementations of the present disclosure provide for methods and systems to implement a technique for processing and rendering video data. In one implementation, a video system renders accurate, high-fidelity back plates for visual effects (VFX), to be used in movies, TV and commercials. This method can draw from beyond 8K resolution assets, or any other asset, allowing the user to freely define a resolution for delivery.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

Features provided in the below implementations can include, but are not limited to, one or more of the following items. For example, in one implementation, camera telemetry is recorded during a video production, along with lens distortion, imager dimensions, nodal point of the lens, focal length, focus distance, and aperture. Also recorded are timecode and/or frame number for each take (or for the duration of the recording). In another implementation, the recorded data is fed into a render engine containing the asset (i.e., the background asset for the plates) by use of a tool or script. Individual frames are then rendered at the desired image quality. It is also possible to combine the individual frames into a video file.

Figure 1:
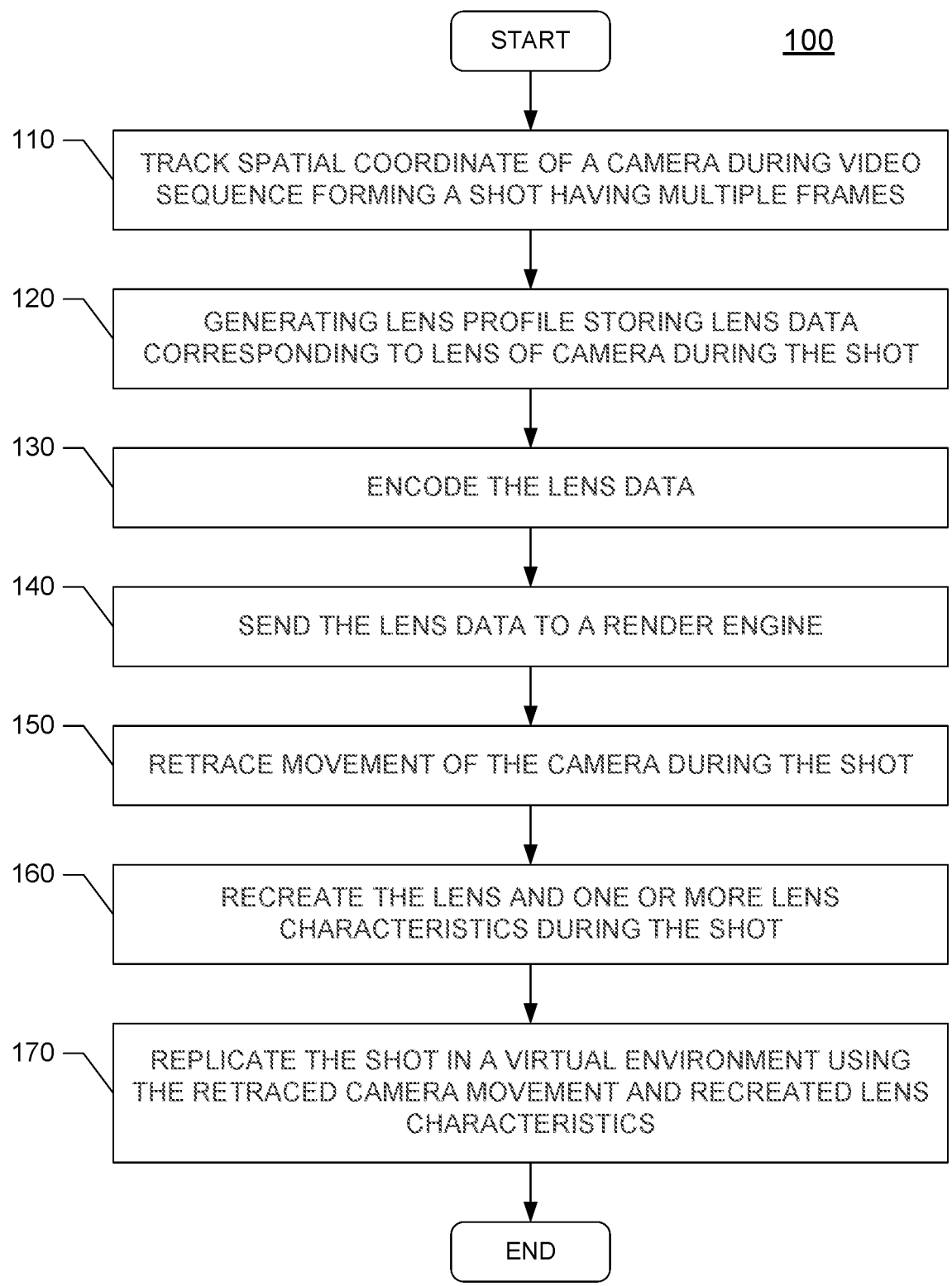
FIG. 1 is a flow diagram of a method for video rendering in accordance with one implementation of the present disclosure.

FIG. 1 is a flow diagram of a method 100 for video rendering in accordance with one implementation of the present disclosure. In the illustrated implementation of FIG. 1, spatial coordinates of a camera is tracked, at step 110, during a video sequence that forms a shot having multiple frames. In one implementation, the spatial coordinates of a camera includes a position of the camera. In another implementation, the spatial coordinates of a camera includes an orientation of the camera.

In one example of operation, the main capture camera position is tracked in real time within the environment. In one implementation, a six-degrees-of-freedom tracking system is used. For example, X, Y, Z coordinates are used for tracking translation from the origin of the virtual camera, and pitch, yaw, roll axes are used to track the local rotation of the camera. In one implementation, the origin (or 0,0,0) of the virtual camera is the nodal point of the physical lens.

In one implementation, the camera includes a lens. A lens profile storing lens data corresponding to the lens of the camera during the shot is generated, at step 120. In one implementation, the lens profile includes following parameters: (1) measurement of active sensor dimensions/film plane/imager; (2) image plane distance to the nodal point; (3) focal length of the camera taking into account zoom and lens breathing; (4) lens distortion profile; (5) image center shift; (6) lens aperture; (7) focus distance; and (8) vignetting or shading of the lens.

In one implementation, the lens data is synchronized to respective frames of the shot. The lens data is encoded, at step 130, and sent to a render engine, at step 140. In one implementation, the lens data is fed back into the render engine using a tool, script or plugin (such as Unreal Engine 4 or Unity). The movement of the camera during the shot is then retraced, at step 150. The lens and one or more characteristics of the lens are recreated, at step 160, during the shot, and the shot is replicated, at step 170, in a virtual environment using the retraced camera movement and recreated lens characteristics.

In one implementation, the render engine retraces the movement of the main capture camera, and mimics the lens and its characteristics, frame by frame, to replicate the shot virtually. This allows the operator to freely define the resolution for the plate while taking full advantage of all image render quality settings. Depending on the quality of the asset, this also means no noise or close to no noise in the digital image. This depends on the resolution quality and capture method of the asset. With high quality assets, it is possible to extract beyond 8K resolution back plates.

Figure 2A:
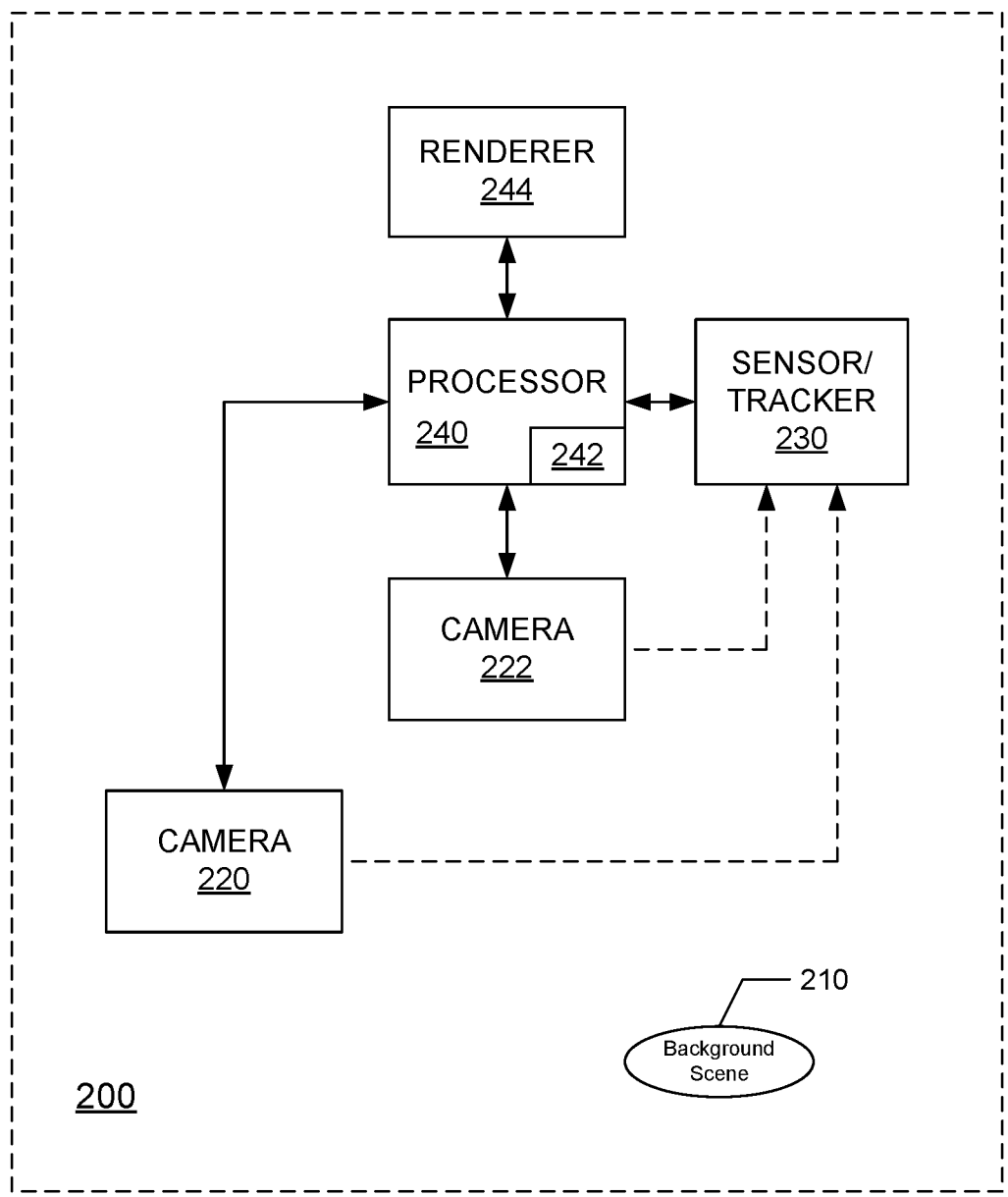
FIG. 2A is a block diagram of a video rendering system in accordance with one implementation of the present disclosure.

FIG. 2A is a block diagram of a video rendering system 200 in accordance with one implementation of the present disclosure. In the illustrated implementation of FIG. 2A, the video rendering system 200 is used in a video production or studio environment. The system 200 includes one or more cameras 220, 222 for image capture of background scene 210, one or more sensors/trackers 230 to track the spatial coordinates (e.g., position and orientation) of the cameras, one or more processors 240 to process the camera and sensor data and provide a render engine 242 for rendering frames of video, and a renderer 244. In one implementation, the system 200 renders frames sourced from a beyond-8K-resolution light detection and ranging (LIDAR) scanned asset. However, it is generally possible to use assets of any quality, even though the asset quality may limit the final achievable resolution.

In the illustrated implementation of FIG. 2A, the tracker 230 tracks spatial coordinates of one or more cameras 220, 222 during a video sequence that forms a shot having multiple frames. In some implementations, the tracker 230 may track spatial coordinates of a single camera 220, in which case, the tracking of camera 222 is optional (dotted line). In one implementation, the spatial coordinates of a camera includes a position of the camera. In another implementation, the spatial coordinates of a camera includes an orientation of the camera.

In one example of operation, the positions of the cameras 220, 222 are tracked in real time within the environment. In one implementation, a six-degrees-of-freedom tracking system is used. For example, X, Y, Z coordinates are used for tracking translation from the origin of the virtual camera, and pitch, yaw, roll axes are used to track the local rotation of the camera. In one implementation, the origin (or 0,0,0) of the virtual camera is the nodal point of the physical lens.

In the illustrated implementation of FIG. 2A, the processor 240 is coupled to the cameras 220, 222. In one implementation, the processor 240 generates a lens profile storing lens data corresponding to the lens of each camera 220 or 222 during the shot. In one implementation, the lens data is synchronized to respective frames of the shot. In another implementation, the lens data is synchronized to a time code. In one implementation, the processor 240 encodes the lens data and sends the encoded lens data to a render engine 242. The processor 240 then retraces the movement of the camera during the shot. The processor 240 also recreates lens and one or more characteristics of the lens and replicates the shot in a virtual environment using the retraced camera movement and recreated lens characteristics. The processor 240 then sends the replicated shot to the renderer 244 to render the shot.

In one implementation, the processor 240 generates the lens profile and encodes the lens data in real time during the production. In one implementation, the lens profile includes following parameters: (1) measurement of active sensor dimensions/film plane/imager; (2) image plane distance to the nodal point; (3) focal length of the camera taking into account zoom and lens breathing; (4) lens distortion profile; (5) image center shift; (6) lens aperture; and (7) focus distance. In another implementation, the lens profile includes light fall off information (i.e., vignette).

In one implementation, the render engine 242 of the processor 240 retraces the movements of the cameras 220, 222, and mimics the lens and its characteristics, frame by frame, to replicate the shot virtually. This allows the operator to freely define the resolution for the plate while taking full advantage of all image render quality settings. Depending on the quality of the asset, this also means no noise or close to no noise in the digital image. This depends on the resolution quality and capture method of the asset. With high quality assets, it is possible to extract beyond 8K resolution back plates.

Figure 2B:
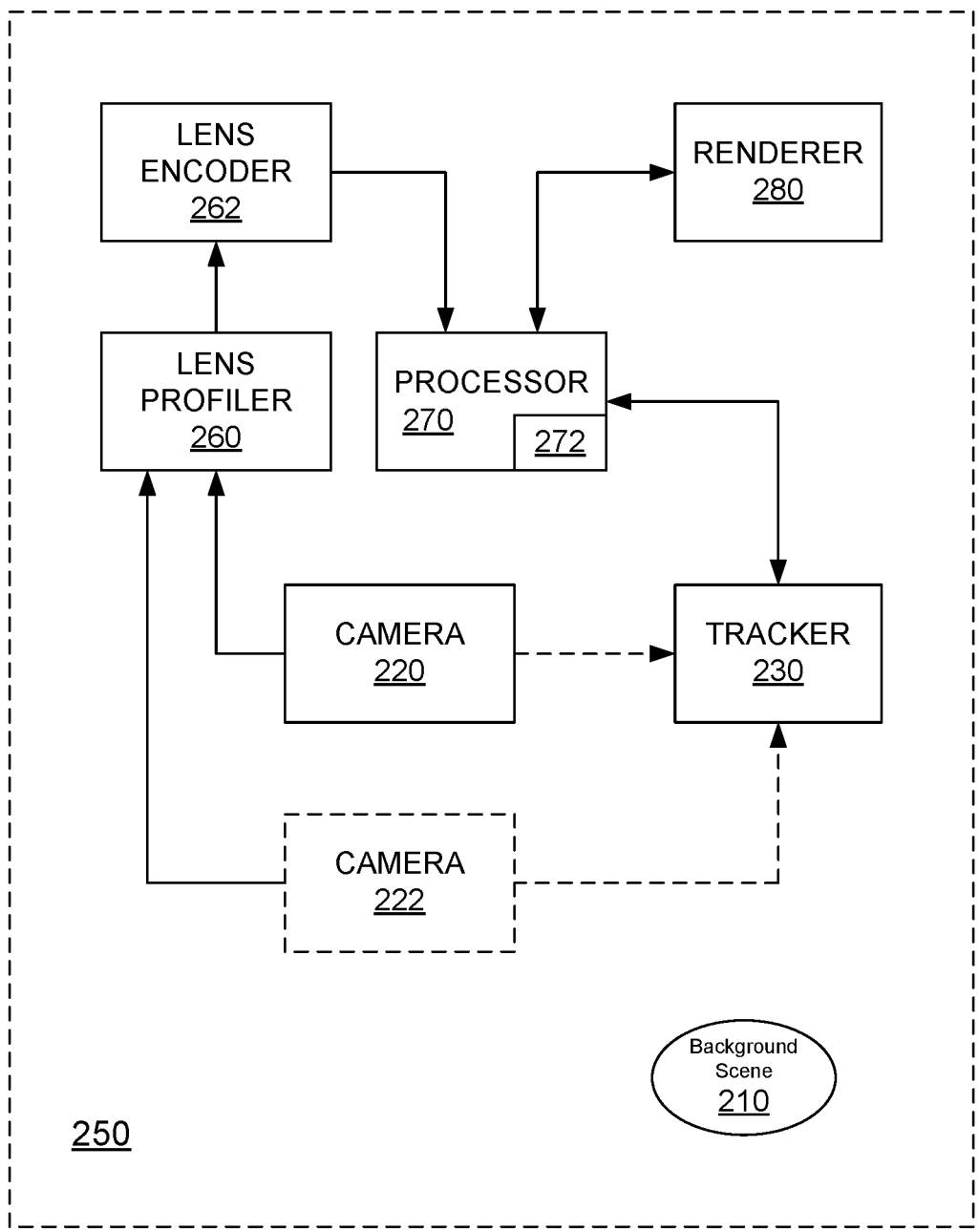
FIG. 2B is a block diagram of a video rendering system in accordance with another implementation of the present disclosure.

FIG. 2B is a block diagram of a video rendering system 250 in accordance with another implementation of the present disclosure. In the illustrated implementation of FIG. 2B, the video rendering system 250 is used in a video production or studio environment. The system 250 includes one or more cameras 220, 222 for image capture of the background scene 210, a tracker 230 to track the spatial coordinates (e.g., position and orientation) of the cameras 220, 222, a lens profiler 260, a lens encoder 262, a processor 270, and a renderer 280. The lens profiler 260, the lens encoder 262, and the processor 270 combine to process the camera and sensor data and provide a render engine 272 for rendering frames of video by the renderer 280. In one implementation, the system 200 renders frames sourced from a beyond-8K-resolution light detection and ranging (LIDAR) scanned asset. However, it is generally possible to use assets of any quality, even though the asset quality may limit the final achievable resolution.

In the illustrated implementation of FIG. 2B, the lens profiler 260 is coupled to the cameras 220, 222. In one implementation, the lens profiler 260 generates a lens profile storing lens data corresponding to the lens of each camera 220 or 222 during the shot. In one implementation, the lens data is synchronized to respective frames of the shot. In another implementation, the lens data is synchronized to a time code. The lens profiler 260 then sends the lens data to the lens encoder 262. In one implementation, the lens encoder 262 encodes the lens data and sends the encoded lens data to the render engine 272 of the processor 270, which then retraces the movement of the camera during the shot. The processor 270 also recreates lens and one or more characteristics of the lens and replicates the shot in a virtual environment using the retraced camera movement from the tracker 230 and recreated lens characteristics from the lens encoder 262. The processor 270 then sends the replicated shot to the renderer 280 to render the shot.

In one implementation, the lens profiler 260 and the lens encoder 262 generate the lens profile and encode the lens data in real time during the production. In one implementation, the lens profile includes following parameters: (1) measurement of active sensor dimensions/film plane/imager; (2) image plane distance to the nodal point; (3) focal length of the camera taking into account zoom and lens breathing; (4) lens distortion profile; (5) image center shift; (6) lens aperture; and (7) focus distance; and (8) vignetting or lens shading.

In one implementation, the render engine 272 of the processor 270 retraces the movements of the cameras 220, 222, and mimics the lens and its characteristics, frame by frame, to replicate the shot virtually. This allows the operator to freely define the resolution for the plate while taking full advantage of all image render quality settings. Depending on the quality of the asset, this also means no noise or close to no noise in the digital image. This depends on the resolution quality and capture method of the asset. With high quality assets, it is possible to extract beyond 8K resolution back plates.

Variations to the system are also possible. For example, assets of any kind and resolution are compatible with this workflow. The quality of the rendered plates depends on the quality of the asset, for example assets that are three-dimensional beyond 8K resolution. It is possible to apply this method to assets of lower resolution, and even two-dimensional assets.

Figure 3A:
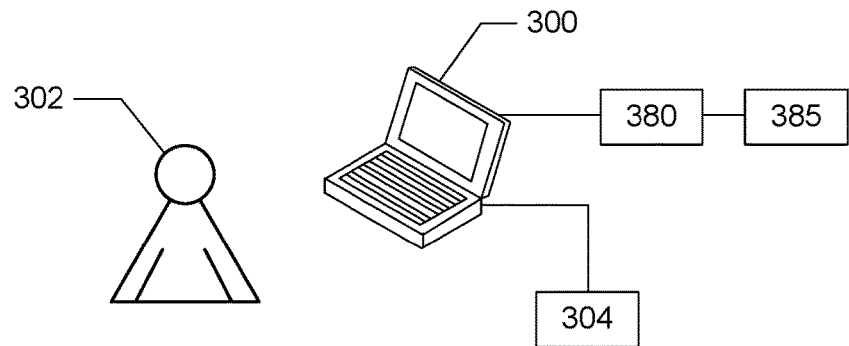
FIG. 3A is a representation of a computer system and a user in accordance with an implementation of the present disclosure.

FIG. 3A is a representation of a computer system 300 and a user 302 in accordance with an implementation of the present disclosure. The user 302 uses the computer system 300 to implement an application 390 for video rendering as illustrated and described with respect to the method 100 in FIG. 1 and the systems 200, 250 in FIGS. 2A and 2B.

Figure 3B:
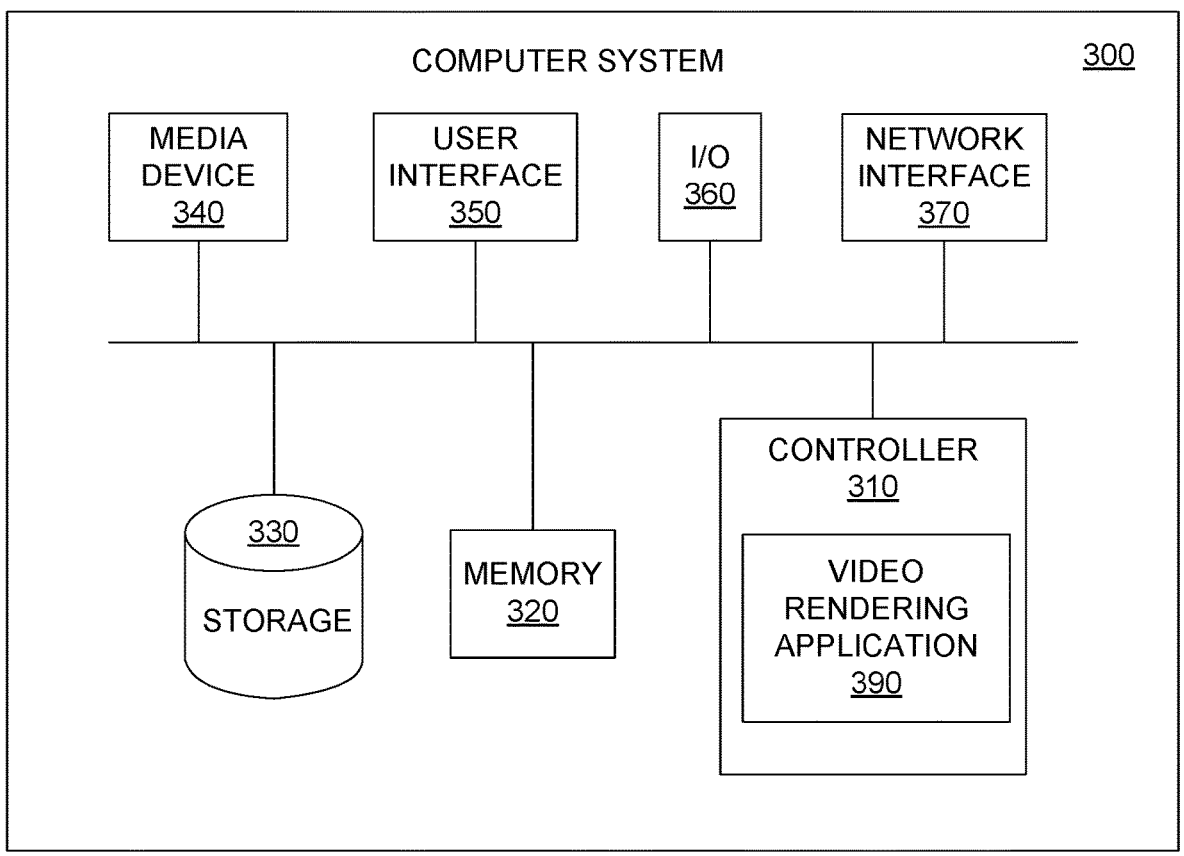
FIG. 3B is a functional block diagram illustrating the computer system hosting the video rendering application in accordance with an implementation of the present disclosure.

The computer system 300 stores and executes the video rendering application 390 of FIG. 3B. In addition, the computer system 300 may be in communication with a software program 304. Software program 304 may include the software code for the video rendering application 390. Software program 304 may be loaded on an external medium such as a CD, DVD, or a storage drive, as will be explained further below.

Furthermore, the computer system 300 may be connected to a network 380. The network 380 can be connected in various different architectures, for example, client-server architecture, a Peer-to-Peer network architecture, or other type of architectures. For example, network 380 can be in communication with a server 385 that coordinates engines and data used within the video rendering application 390. Also, the network can be different types of networks. For example, the network 380 can be the Internet, a Local Area Network or any variations of Local Area Network, a Wide Area Network, a Metropolitan Area Network, an Intranet or Extranet, or a wireless network.

FIG. 3B is a functional block diagram illustrating the computer system 300 hosting the video rendering application 390 in accordance with an implementation of the present disclosure. A controller 310 is a programmable processor and controls the operation of the computer system 300 and its components. The controller 310 loads instructions (e.g., in the form of a computer program) from the memory 320 or an embedded controller memory (not shown) and executes these instructions to control the system, such as to provide the data processing to capture camera movement data. In its execution, the controller 310 provides the video rendering application 390 with a software system, such as to render the back plates. Alternatively, this service can be implemented as separate hardware components in the controller 310 or the computer system 300.

Memory 320 stores data temporarily for use by the other components of the computer system 300. In one implementation, memory 320 is implemented as RAM. In another implementation, memory 320 also includes long-term or permanent memory, such as flash memory and/or ROM.

Storage 330 stores data either temporarily or for long periods of time for use by the other components of the computer system 300. For example, storage 330 stores data used by the video rendering application 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure.

Additional variations and implementations are also possible. For example, in addition to video production for movies or television, implementations of the system and methods can be applied and adapted for other applications, such as commercials, web-based or internet content, virtual production (e.g., virtual reality environments), and visual effects. Accordingly, the present disclosure is not intended to be limited to the implementations shown herein but is to be accorded the widest scope consistent with the principal and novel features disclosed herein.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for video rendering a background scene without using a background plate, the method comprising:
    tracking spatial coordinates of at least one camera during a video sequence forming a shot having multiple frames and outputting the tracked spatial coordinates as sensor data so that movement of the at least one camera is retraceable, wherein each of the at least one camera has a lens,
    wherein the at least one camera captures images of the background scene in the shot without a subject;
    creating a lens profile storing lens data corresponding to the lens of the at least one camera during the shot;
    encoding the lens data;
    sending the lens data to a render engine;
    retracing the movement of the at least one camera during the shot at the render engine using the sensor data including the tracked spatial coordinates to replicate the shot virtually so that the background scene is rendered without using the background plate;
    recreating the lens and one or more characteristics of the lens during the shot using the lens data; and
    replicating the shot in a virtual environment using the retraced camera movement and the recreated one or more lens characteristics,
    wherein replicating the shot includes mimicking the lens and the lens characteristics, frame by frame, to replicate the shot virtually and to enable defining of a resolution for the background scene.

2. The method of claim 1, wherein the spatial coordinates of each of the at least one camera comprises a position of each camera.

3. The method of claim 1, wherein the spatial coordinates of each of the at least one camera comprises an orientation of each camera.

4. The method of claim 3, wherein the orientation of each camera includes pitch, yaw, roll axes used to track local rotation of each camera.

5. The method of claim 1, wherein the lens profile includes a nodal point which is a point where all light beams intersect and cross within the lens, which is then projected onto an image plane.

6. The method of claim 5, wherein the lens profile includes at least one of: a distance to the image plane to the nodal point; a focal length of each camera; a lens distortion profile; an image center shift; a lens aperture; a focus distance; and vignetting or lens shading.

7. The method of claim 1, further comprising
    synchronizing the lens data to respective frames of the shot.

8. A system for video rendering a background scene without using a background plate, the system comprising:
    at least one camera to capture images of the background scene without a subject, the at least one camera to output the captured images as camera data, wherein each of the at least one camera has a lens;
    at least one sensor to track spatial coordinates of the at least one camera during a video sequence forming a shot having multiple frames, the at least one sensor to output the tracked spatial coordinates as sensor data so that movement of the at least one camera is retraceable, wherein the at least one camera captures images of the background scene in the shot without a subject; and
    a processor coupled to the at least one camera and the at least one sensor, the processor to generate a lens profile storing lens data corresponding to the lens of the at least one camera during the shot, wherein the processor processes the camera data, the sensor data, and the lens data to replicate the shot by: encoding the lens data; sending the lens data to a render engine; retracing movement of the at least one camera during the shot using the camera data and the sensor data including the tracked spatial coordinates to replicate the shot virtually so that the background scene is rendered without using the background plate; recreating the lens and one or more characteristics of the lens during the shot using the lens data; and replicating the shot in a virtual environment using the retraced camera movement and the recreated one or more lens characteristics, wherein replicating the shot includes mimicking the lens and the lens characteristics, frame by frame, to replicate the shot virtually and to enable defining of a resolution for the background scene.

9. The video rendering system of claim 8, wherein the lens data is synchronized to respective frames of the shot.

10. The video rendering system of claim 8, wherein the lens data is synchronized to a time code.

11. The video rendering system of claim 8, further comprising a renderer to render the replicated shot.

12. A non-transitory computer-readable storage medium storing a computer program to render video of a background scene without using a background plate, the computer program comprising executable instructions that cause a computer to:

track spatial coordinates of at least one camera during a video sequence forming a shot having multiple frames and output the tracked spatial coordinates as sensor data so that movement of the at least one camera is retraceable, wherein each of the at least one camera has a lens, wherein the at least one camera captures images of the background scene in the shot without a subject;

generate a lens profile storing lens data corresponding to the lens of the at least one camera during the shot;

encode the lens data;

send the lens data to a render engine;

retrace the movement of the at least one camera during the shot at the render engine using the sensor data including the tracked spatial coordinates to replicate the shot virtually so that the background scene is rendered without using the background plate;

recreate the lens and one or more characteristics of the lens during the shot using the lens data; and replicate the shot in a virtual environment using the retraced camera movement and the recreated one or more lens characteristics, wherein replicating the shot includes mimicking the lens and the lens characteristics, frame by frame, to replicate the shot virtually and to enable defining of a resolution for the background scene.

13. The non-transitory computer-readable storage medium of claim 12, wherein the spatial coordinates of each of the at least one camera comprises a position of each camera.

14. The non-transitory computer-readable storage medium of claim 12, wherein the lens profile includes a nodal point which is a point where all light beams intersect and cross within the lens, which is then projected onto an image plane.

15. The non-transitory computer-readable storage medium of claim 14, wherein the lens profile includes at least one of: a distance to the image plane to the nodal point; a focal length of each camera; a lens distortion profile; an image center shift; a lens aperture; a focus distance; and vignetting or lens shading.

16. The non-transitory computer-readable storage medium of claim 12, further comprising executable instructions that cause the computer to synchronize the lens data to respective frames of the shot.

* * * * *